United States Patent [19]
Megerle et al.

[11] Patent Number: 5,879,060
[45] Date of Patent: Mar. 9, 1999

[54] ELECTRICALLY CONTROLLABLE VALVE, ESPECIALLY FOR INSTALLATION IN A HYDRAULIC BRAKE SYSTEM OF A VEHICLE

[75] Inventors: Friedrich Megerle, Sonthofen; Guenther Schnalzger, Blaichach; Andrew-James Griffiths, Rettenberg-Rottach, all of Germany

[73] Assignee: Robert Bosch GmbH, Stuttgart, Germany

[21] Appl. No.: 770,104

[22] Filed: Dec. 19, 1996

[30] Foreign Application Priority Data

Dec. 19, 1995 [DE] Germany .......................... 195 47 374.4

[51] Int. Cl.⁶ ...................................................... B60T 8/36
[52] U.S. Cl. .................................... 303/119.2; 251/121.02
[58] Field of Search ............................... 303/119.2, 119.1, 303/119.3, 116.1; 251/129.02, 129.07

[56] References Cited

FOREIGN PATENT DOCUMENTS 1914765 of 0000 Germany .
4035817 of 0000 Germany .
4336860 of 0000 Germany .

*Primary Examiner*—Lee W. Young
*Attorney, Agent, or Firm*—Edwin E. Greigg; Ronald E. Greigg

[57] ABSTRACT

Multiposition valves are used for instance to interrupt a flow of pressure fluid that begins at a pressure source, such as a master cylinder, and leads to a consumer, such as a wheel brake. To that end, such multiposition valves have a valve seat, a valve seat closing body, an electromagnet which presses the valve closing body against the valve seat, and a valve opening spring, so that when the electromagnet is turned off, the valve closing body assumes an outset position spaced apart from the valve seat. To reduce noise production, especially when power is supplied in pulsed fashion to the electromagnet a further spring is provided that urges the armature in the direction of its outset position, so that when the valve opens, the armature can lead ahead of the valve closing body. The valve is advantageously usable in a hydraulic vehicle brake system where irritating noise production during operation is to be avoided.

5 Claims, 4 Drawing Sheets

ELECTRICALLY CONTROLLABLE VALVE, ESPECIALLY FOR INSTALLATION IN A HYDRAULIC BRAKE SYSTEM OF A VEHICLE

BACKGROUND OF THE INVENTION

German Patent Disclosure DE 43 36 860 A1 discloses a two-connection/two-position valve of the generic type involved here, known for short as a 2/2-way valve; it has a housing that has a longitudinal bore, a valve seat resting in the housing, a closing body associated having the valve seat, a tappet connected to the closing body and displaceable in the longitudinal bore, an opening spring engaging the tappet, an armature, oriented toward the tappet, for displacing the closing body enclosing the valve seat, and an electromagnet which has a magnetic coil. This 2/2-way valve is intended for installation in a hydraulic vehicle brake system and in particular in an anti-skid brake system for conditionally dependent variation of wheel brake pressures in wheel brake cylinders to avoid the danger of wheel locking. However, such a 2/2-way valve can also be used for arbitrary electrically controllable variation of brake pressure and for automatic variation of brake pressure, for instance to limit drive slip at drivable wheels by braking, or to generate wheel brake slip for the sake of side slip generation to change the driving performance of a vehicle equipped with it. As the name, two-position valve, indicates, the only positions this valve assumes are "open" and "closed". Because of the relatively small structural size of the 2/2-way valve and hence of its electromagnet, its armature directs the closing body to the valve seat lightning-fast, and conversely because of the short return time of the armature to its outset position, this 2/2-way valve is also opened very fast, resulting in the generation of irritating noise in the vehicle brake system. To counteract such irritating noise production, the 2/2-way valve of DE 43 36 860 A1 is assigned a damping device, which for instance as shown in FIG. 1 comprises a cylinder, a piston displaceable in the cylinder, and a damping spring acting on the piston. The cylinder has one connection on each of its ends; the first connection communicates with a first connection of the 2/2-way valve, and the second connection communicates with a second connection of the 2/2-way valve. If there is a flow through the normally-open 2/2-way valve so that the valve is closed lightning-fast, then the damper, by displacement of its piston counter to the force of its damper spring, absorbs kinetic energy from the flowing medium, thereby both limiting the rates of pressure change and limiting pressures, and thus lessening the sources of noise production. The high technological expense for the damper is a disadvantage.

Another 2/2-way valve, in accordance with German Patent Disclosure DE 40 35 817 A1, is provided with a hydraulic damper which has a piston and a check valve and which, on the opening of the 2/2-way valve by means of an opening spring, on the occasion of the displacement of the tappet together with the closing body, presents a speed-dependent resistance, and as a result limits the speed of displacement of the tappet and thus of the closing body. Such a damper, using a piston, is expensive, especially because it is necessary to manufacture a damper cylinder or damper cylinder bore with the smoothest possible surface. If the damper piston is equipped with a sealing sleeve, then a throttle in the wall of the damper cylinder is also needed, but its cross section is narrow and it can therefore tend to become soiled, thus causing perhaps excessively slow opening of this 2/2-way valve. That would lead to an overly low flow of pressure fluid per unit of time and hence to a slow buildup of brake pressure and a long vehicle braking distance. One advantage is that by the intentionally slowed opening of the 2/2-way valve, volumetric flows arise in delayed fashion, and as a result pressure changes caused by these volumetric flows are likewise delayed, which aids in avoiding disadvantageous noise development.

OBJECT AND SUMMARY OF THE INVENTION

The electrically controllable valve as defined by the characteristics of the body of claim 1 has the advantage that, at only little technological expense, the speed of the tappet and of the closing body connected to it remains below the speed of the armature, as soon as a closing event is terminated by the turning off of the electromagnet. This provision, which is intended to impede irritating noise development, requires less technological expense than the previously known 2/2-way valve of DE 40 35 817 A1.

Advantageous further features of and improvements to the valve defined herein are possible with the provisions recited hereinafter.

The exemplary embodiment has the advantage that the further or second spring, on opening of the valve of the invention, creates a gap between the armature and the tappet when the exciter current of the magnet coil is shut off, and as a result the tappet and the closing body move more slowly than the armature. Hence the valve of the invention opens slower than the multiposition valve of DE 43 36 860 A1 and is hence less expensive than a 2/2-way valve equipped with a hydraulic damping device in accordance with DE 40 35 817 A1. In the valve of the invention, the lead of the armature as compared with its tappet is reinforced by hydraulic braking of the tappet, caused by its displacement in the housing in the direction of the sealed-off armature chamber, in which chamber the armature, having at least one longitudinal groove, is surrounded by pressure fluid and is movable.

For installing the further or second spring, it can be considered advantageous here that the second or further spring, which is now supported on a resting axial stop and can be embodied as stronger than the first spring, which serves to move the closing body that is united with the tappet away from the valve seat and keep it away. Also, the axial stop might be at rest or horizontal. The rise in speed of the closing body and its tappet when the electromagnet is turned off will depend on how strong the first spring is and on its initial tension on installation, and on how well a radial play, dimensioned between the tappet and the longitudinal bore of the housing, cooperates with the cross section of the tappet of a damper upon displacement of the tappet in the direction of the armature chamber that contains pressure fluid. Another advantage of this version is that the aforementioned hydraulic damping needs to be adapted only to the force of the first spring, which engages the tappet and is preferably embodied as the weaker spring. As a result, there is no need to embody the radial play as relatively narrow, which would be expensive.

The exemplary embodiment as defined herein offers a property, known from European Patent Disclosure EP 0 302 250 B1, of flow quantity control through the valve in such a way normally, or in other words in braking without the danger of wheel locking, that the valve is fully open, while in the anti-lock mode, for instance, after the closure by means of the electromagnet and after the electromagnet is turned off, and depending on the size of a pressure drop between the connections of the valve and accordingly on the possible flow speed, the valve is initially only partly opened, as a consequence of the physical property known by the term "hydrodynamic paradox". Because of this only partial opening, throttling to limit a brake pressure rise speed in a downstream brake is advantageously attained.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
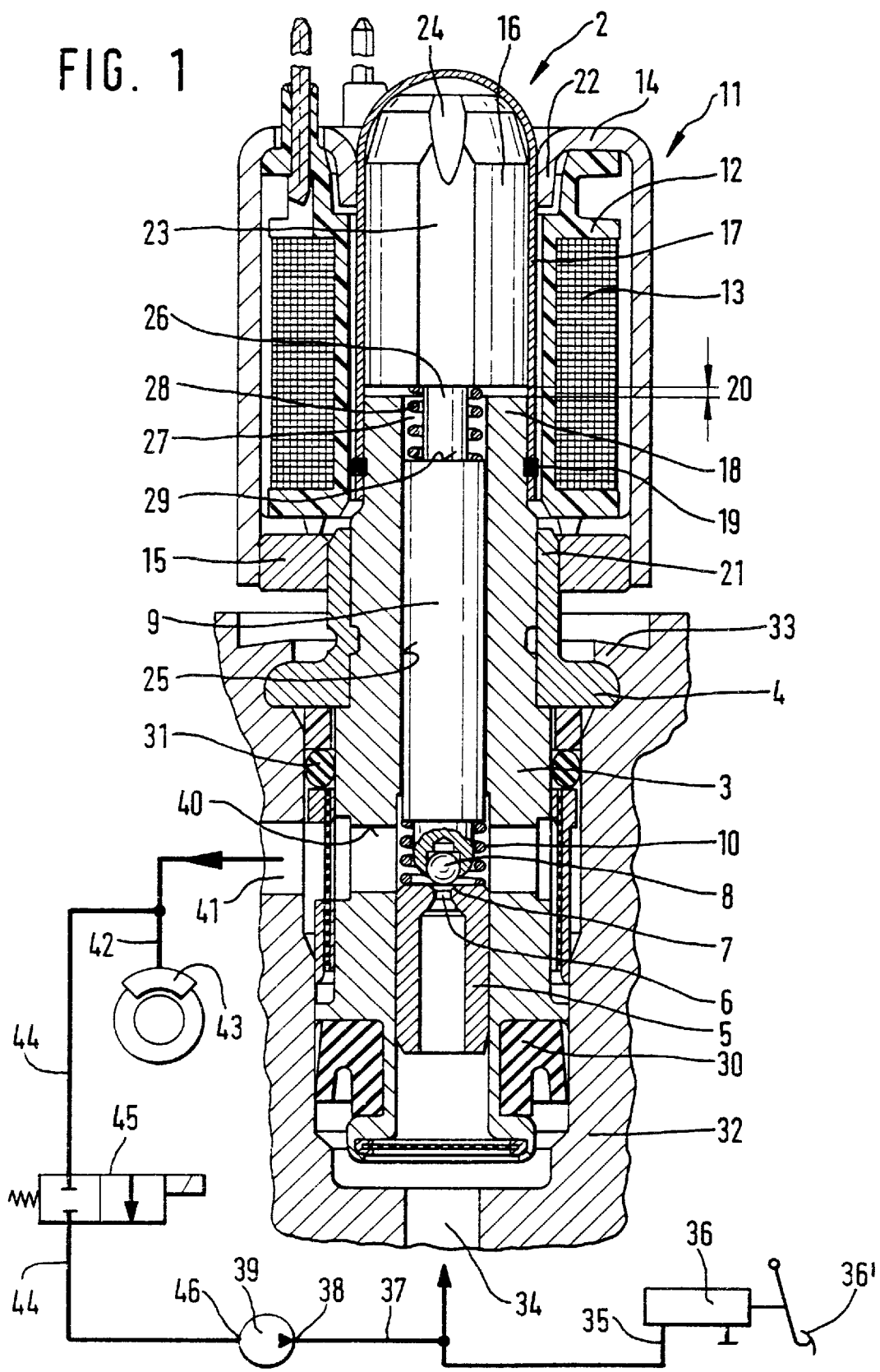
FIG. 1 shows a first exemplary embodiment of the valve according to the invention in its basic position.

The first exemplary embodiment of the valve 2 of FIG. 1 has a valve housing 3; a fastening flange 4, surrounding and joined to the valve housing 3; a valve seat body 5, press-fitted into the valve housing 3, the valve seat body has a through opening 6 and a valve seat 7 adjoining the through opening 6 and opening into the valve housing 3; a valve closing body 8, embodied for instance as a ball; a control tappet 9 adjoining the valve closing body 8; a valve opening spring 10; and an electromagnet 11. The electromagnet in turn has a coil holder 12, an exciter coil 13, an essentially cup-shaped magnet flux guide body 14, an essentially annular further magnet flux guide body 15, and a movable armature 16.

Figure 2:
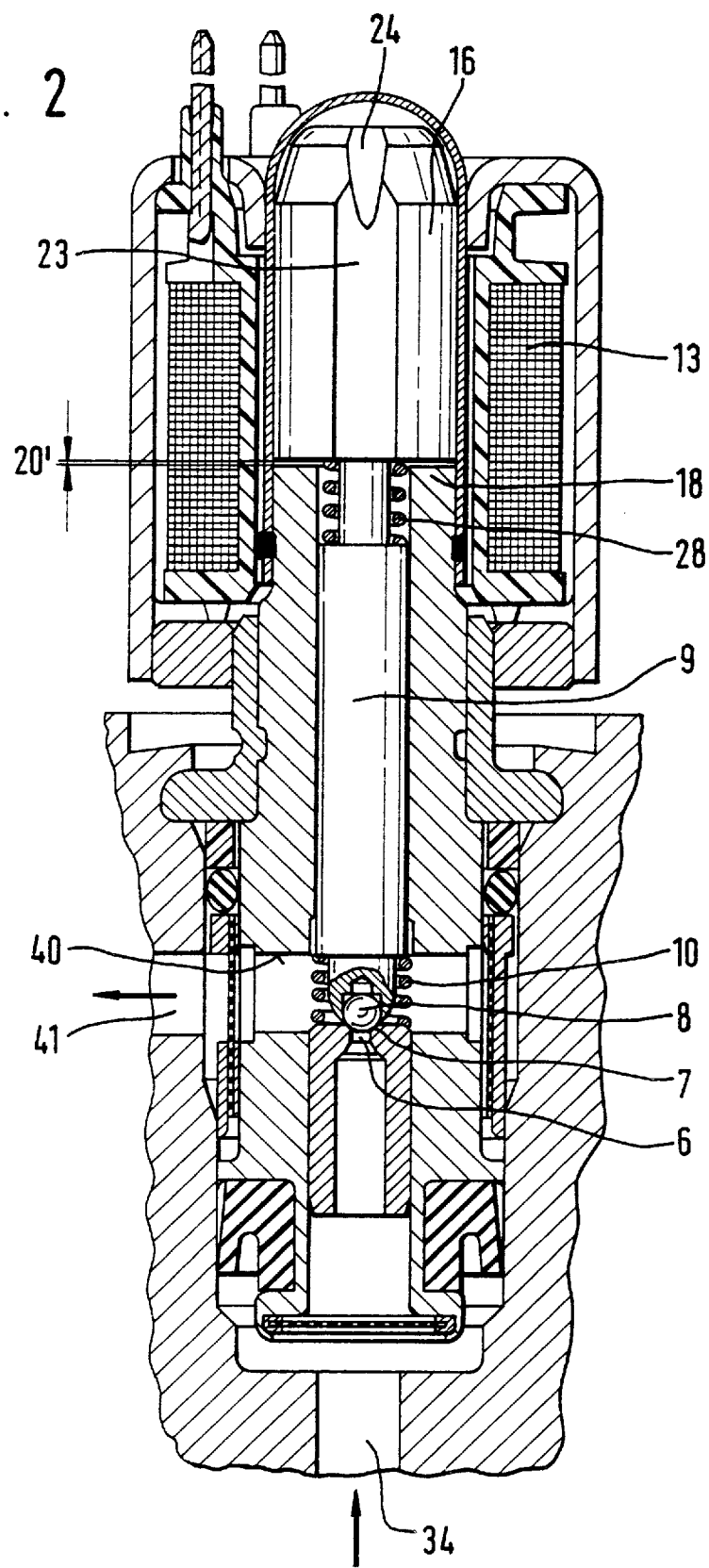
FIG. 2 shows the valve of FIG. 1 in the closing position.

The armature 16 is longitudinally displaceable inside an armature guide tube 17, closed on one end in domelike fashion, which is inserted via one end 18 of the valve housing 3 and is secured at this end 18 by a weld seam 19. The armature 16 adjoins the control tappet 9. Opposite the armature 16, the valve opening spring 10 acts upon the tappet 9 and, depending on the installed position, by means of the tappet 9, it displaces or raises the armature 16 into an outset position shown in FIG. 1, so that an air gap 20 is present between the armature 16 and the end 18 of the valve housing 3. The valve housing 3 comprises a soft magnetic material, such as a readily machinable steel, and in this way it forms a hollow magnet pole. A tubular neck 21, likewise of a soft magnet material, extends from the fastening flange 4 toward the end 18. The annular magnet flux guide body 15 surrounds the neck 21 and forms a magnetic flux bridge to the essentially cup-shaped magnet flux guide body 14, which surrounds the exciter coil 13 and the coil holder 12. The magnet flux guide body 14 has a neck 22, which fits around the armature guide tube 17 over a portion of its length and is located in radial alignment with the armature 16. Consequently, a guide device for magnetic flux lines results, beginning at the air gap 20 and extending through the end 18, the neck 21, the magnet flux guide body 15, and the magnet flux guide body 14 with its neck 22; in the region of the neck 22, these magnetic flux lines penetrate the armature guide tube, which is of nonmagnetizable material, and pass on to the armature 16, which ends at the air gap 20. Consequently, imposing exciter current on the exciter coil 13 has the effect that the armature 16 and the end 18 attract one another mutually; as a result, the armature 16 can make the air gap 20 shrink, counter to the action of the valve opening spring 10. The air gap 20 is dimensioned such that upon a motion of the armature 16 in the direction of the tappet 9, it can move the tappet 9 and thus the valve closing body 8 far enough that the valve closing body 8 is seated sealingly on the valve seat 7; a residual air gap 20', shown in FIG. 2, is left over.

To enable the armature 16 to execute the aforementioned stroke without significant hydraulic hindrance, two grooves 23 and 24, for instance, are machined longitudinally on the circumference of the armature 16. Accordingly, within the armature guide tube 17, these grooves 23 and 24 leave sufficient opportunity for pressure fluid located inside the armature guide tube 17 to be shifted from one face end of the armature 16 to another on the occasion of motions of the armature 16.

In a way that is part of the invention, the diameters of the control tappet 9 and a bore 25 of the valve housing 3 are adapted to one another in such a way that a narrow radial gap, not shown, remains between the bore 25 and the circumference of the tappet 9; when pressure fluid flows axially through this gap, the gap takes on the task of a throttle.

In another way that is part of the invention, an end 26 of the control tappet 9 oriented toward the armature 16 is embodied in the manner of a tang, which has a smaller diameter than does the control tappet 9 in the middle region of the control tappet. Because of this embodiment of the end 26, an annular chamber 27 is created between this end 26 and the bore 25, for receiving a further or in other words second spring 28 that is essential to the invention. This further spring 28 is installed in the prestressed state; it presses on one end against an axial stop face 29, which forms a transition from the largest diameter of the control tappet 9 to the diameter of the tanglike end 26, and on the other end, on its face end, it presses against the armature 16 in such a way that the further spring 28 attempts to separate the control tappet 9 and the armature 16 from one another. In the basic position of the valve 2 as shown in FIG. 1, however, the force of the valve opening spring 10 predominates, so that, as shown, the tanglike end 26 of the control tappet 9 and the armature 16 rest on one another.

Before the mode of operation of the valve 2 effected by the disposition of the further spring 28 is described, the linkage of this valve to other elements of the vehicle brake system will first be described.

The valve 2 is accommodated in sealing fashion, with the aid of seals 30 and 31, in a housing block 32, and it is held in this housing block 32 by means of a caulking 33 oriented toward the fastening flange 4. Through the housing block 32 and a conduit 34 extending in it and through a main brake line 35, the through opening 6 communicates with a master cylinder 36 on one side; on the other side, through a return line 37, it communicates with an outlet 38 of a return pump 39. At the level of the valve seat 7, the valve housing 3 has at least one crosswise-extending connection bore 40, which communicates with a further conduit 41 that is located in the housing block 32. A wheel brake 43 is connected to this conduit 41 by means of a wheel brake line 42. Communicating with the wheel brake line is a brake pressure lowering line 44, into which a 2/2-way valve 45 is installed and which ends at an inlet 46 of the return pump 39.

Mode of Operation of the Valve According to the Invention

If no electric current is supplied to the exciter coil 13 of the valve 2, then the force of the valve opening spring 10 causes the control tappet 9 and the armature 16 to assume the basic position shown in FIG. 1, in which the ball-like valve closing body 8 is at the greatest possible distance from the valve seat 7, and the end 26 of the control tappet 9 has mechanical contact with the armature 16 that is pressed into its outset position. Because of the mechanical contact, the further spring 28 has its maximum compression and accordingly its greatest spring force. In contrast to this, the valve opening spring 10 has its least compression. Because of this maximum possible opening of the valve 2, a practically unhindered flow of pressure fluid out of the master cylinder 36 is possible through the master brake line 25, the valve 2 and the wheel brake line 42 into the wheel brake 43. This flow takes place on the occasion of the actuation of a brake pedal 36' of the master cylinder 36. If the brake pedal 361 is released, the pressure in the master cylinder 36 drops, and the pressure fluid previously forced into the wheel brake 43 flows back through the valve 2 into the master cylinder 36.

The wheel brake 43 is assigned to a vehicle wheel, not shown. If it should happen that a brake pressure generated by actuation of the brake pedal 36' and reaching the wheel brake 43 causes overbraking of the vehicle wheel and thus the danger of locking, then exciter current is supplied to the exciter coil 13, with the consequence that the armature 16 presses against the control tappet 9, thus overcoming both the opening force of the valve opening spring 10 and the force of the further spring 28. Consequently the ball-like valve closing body 8 is pressed against the valve seat 7, as shown in FIG. 2. The result of this is that a flow of pressure fluid out of the master cylinder 36 to the wheel brake 43 is prevented. To eliminate the danger of wheel locking, on the one hand the 2/2-way valve 45 shown in FIG. 1 is opened, and the return pump 39 is also turned on, causing at least a portion of the pressure fluid located in the wheel brake 43 to be pressed back through the return line 37 by means of the return pump 39 and finally through the master brake line 35 into the master cylinder 36, where it is then again available for braking purposes.

The brake pressure lowering as described, by opening of the 2/2-way valve 45 and by turning on the return pump 39, has the effect that a pressure gradient is established between the through opening 6 and the connection bore 40 of the valve 2; this pressure gradient is greater, the more strongly the brake pedal 36 is actuated and the lower a coefficient of friction is between the vehicle wheel, not shown, and a road surface.

Once the danger of wheel locking has been eliminated by lowering the brake pressure of the wheel brake 43 as described and by reducing the pressure gradient established as a result, it is optionally possible to raise the pressure in the wheel brake 43, at least in part, up to the pressure that prevails in the master cylinder 36, or in other words to at least reduce the aforementioned pressure gradient. To that end, the exciter current to the exciter coil 13 should for instance be turned off for some time or be turned on and off cyclically, as taught for instance by German Patent Disclosure DE 19 14 756 A1. In the aforementioned patent disclosure, a clock generator is described that has a clock frequency below the limit frequency of such a multiposition valve; the limit frequency is determined by masses present in the valve, by spring forces, by properties of the electromagnet used, and by the means that turn the exciter current on and off. DE 19 14 765 A1 indicates that by selection of pulse-to-interval ratios, the average flow can be reduced compared with a permanently opened multiposition valve, resulting in an overall slower brake pressure rise in the wheel brake. Per pulse and hence per opening of the valve 2, a pressure rise increment occurs downstream of the valve 2, causing noise to be generated.

Figure 3:
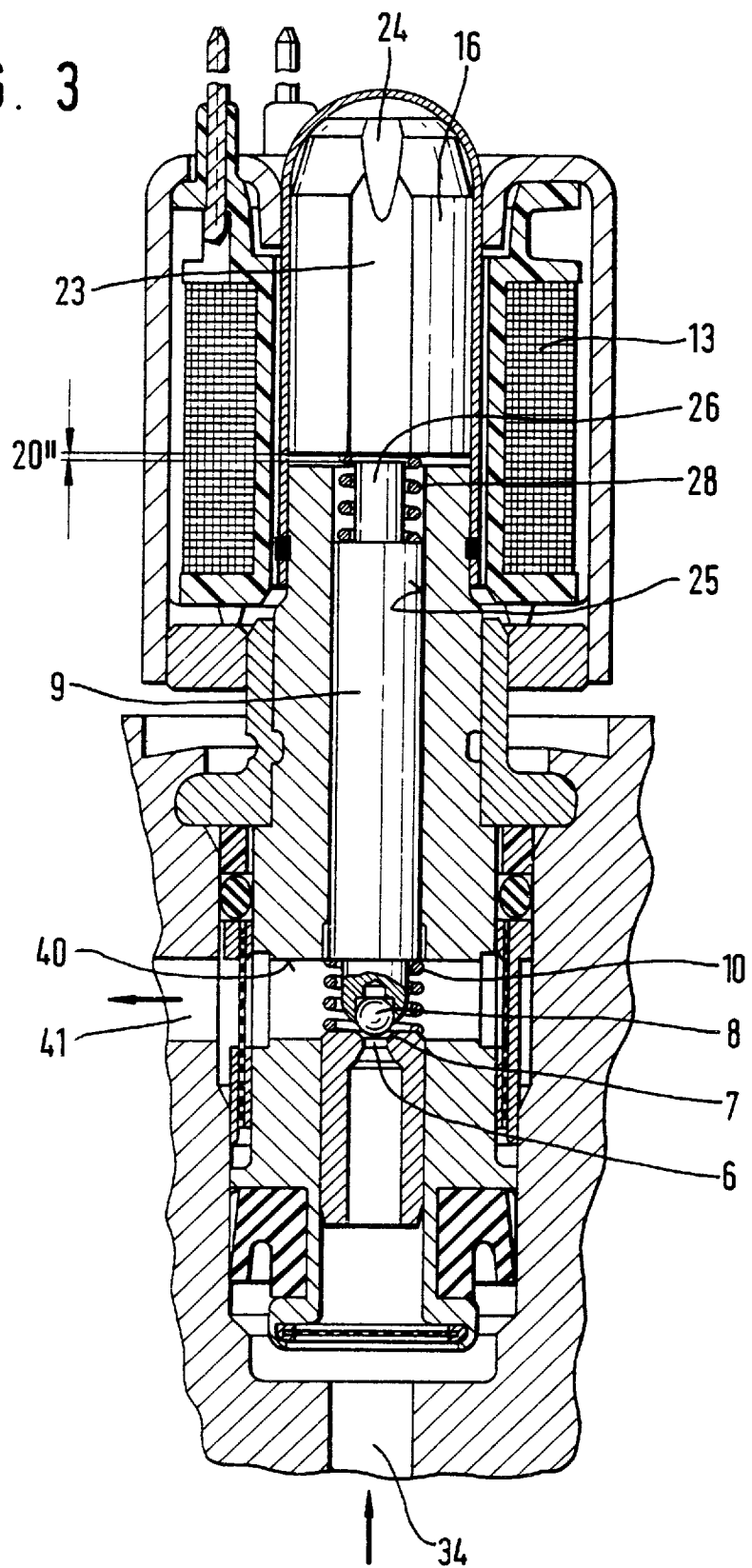
FIG. 3 shows the valve of FIG. 1 in an intermediate position, each of these being seen in longitudinal section.

In the manner according to the invention, such pressure rise increments are kept small, either by slowly opening the valve 2 and/or by opening it only partially, as shown for instance in FIG. 3. The procedure then is as follows. The exciter current of the exciter coil 13 is turned off. Consequently, the stressed further spring 28 displaces the armature 16 inside the armature guide tube 17; the displacement of the armature 16 is practically unhindered, since the grooves 23 and 24 between the face ends of the armature 16 make flow cross sections available on the armature 16. In other words, the grooves 23, 24 are provided so that essentially only the mass of the armature and its magnetic properties stand in the way of a rapid displacement of the armature 16.

In a contrast to the easy displaceability of the armature 16, the displaceability of the control tappet 9 is hindered, as already noted, by a narrow radial play between the control tappet 9 and the bore 25 that receives it, so that plunging of the end 26 of the control tappet 9 into the armature guide tube 17 filled with pressure fluid is hydraulically damped and accordingly takes place with a time lag. As a result, the ball-like valve closing body 8 is moved away from the valve seat 7 only slowly, and pressure rise increments are introduced more gently. This serves to reduce noise.

A further property of the valve 2, which reinforces the invention, is that as taught by the European Patent Disclosure EP 0 302 250 B1 named in the background section, the valve seat 7 has been given a geometry such that from the time the ball-like valve closing body 8 lifts from the valve seat 7, a flow develops that acts aspiratingly on the ball-like valve closing body 8 in accordance with the hydraulic paradox and, as long as the flow maintains adequate speed, counteracts a complete opening of the valve 2. The resultant alignment of the control tappet 9 is represented qualitatively in FIG. 3 by a spacing 20" that is established between the armature 16 and the end 26 of the control tappet 9. The above-described hydraulic damping, that is, the delay in motion of the control tappet 9, counteracts a possibly present inclination to oscillate caused by the hydrodynamic paradox. In summary, it can accordingly be stated that in anti-lock operation, which is characterized by alternating lowering and raising of wheel brake pressures, the valve 2 according to the invention furnishes a smaller flow cross section than in the normal braking mode on the occasion of an actuation of the brake pedal 36, when the valve 2 is in its normal position as shown in FIG. 1, with the maximum possible opening cross section or in other words the structurally dictated maximum possible spacing between the valve seat 7 and the ball-like valve closing body 8. To this extent, the valve 2 of the invention functions in the manner of a flow regulating valve, analogously to the valve known from EP 0 302 250 E1. This has the advantage that the volumetric flow of pressure fluid per unit of time is automatically limited if there is an adequate pressure difference for flow development between the inlet-side through opening 6 and the outlet-side connection bore 40.

The second exemplary embodiment of the valve 2a according to the invention, is supported on a stationary axial stop 50. This axial stop 50 is embodied as a bush, which is press-fitted into the bore 25 of the resting valve housing 3. So that this axial stop 50 will not be in the way of a motion of the control tappet 9a, the end 26a of the control tappet 9a, embodied like a tang, is made longer than the end 26 of the control tappet 9 shown in FIG. 1.

Figure 4:
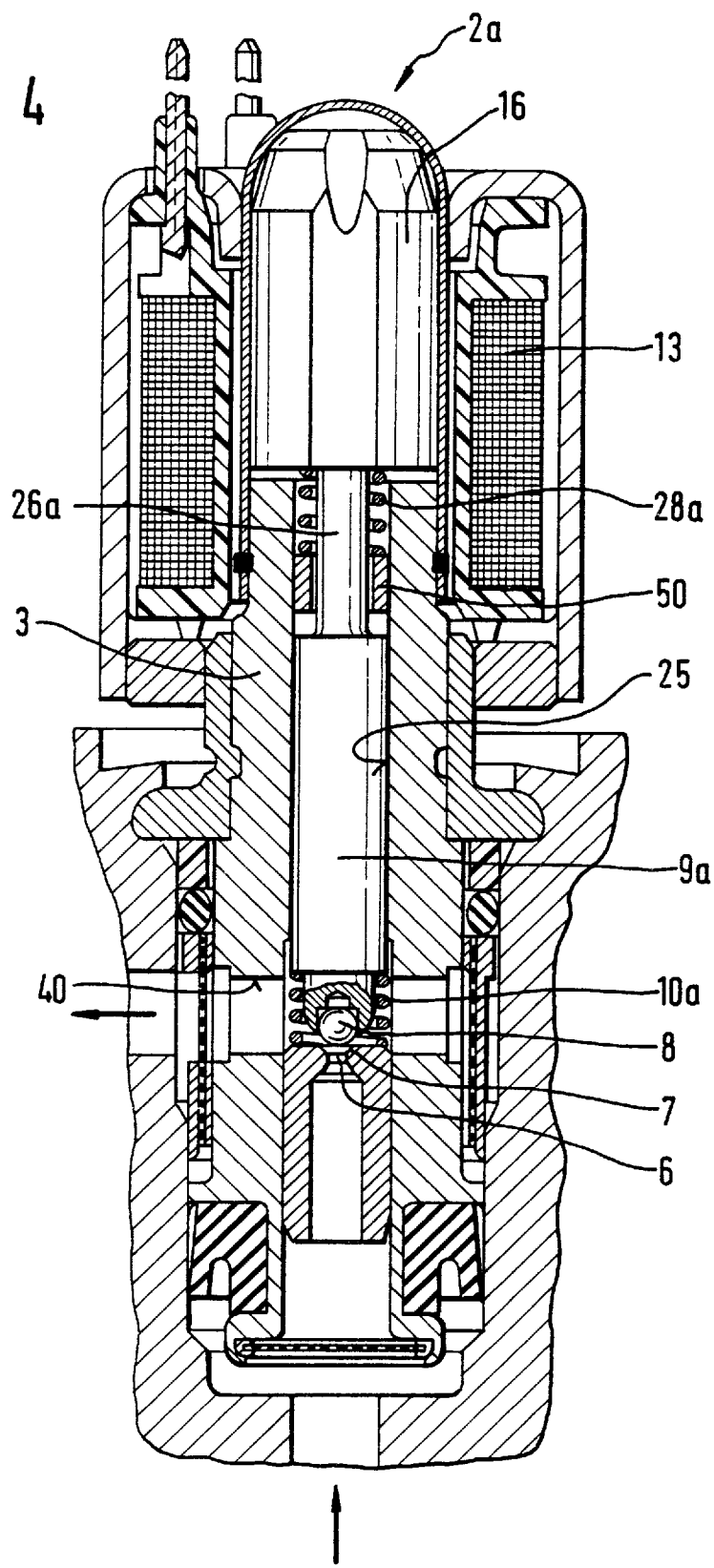
FIG. 4 shows a second exemplary embodiment of the valve of the invention, in its basic position, in longitudinal section.

A further distinction is that because of the support of the further, second spring 28a on the axial stop 50, the further spring 28a need merely be adapted to the restoration of the armature 16. The valve opening spring 10a, which again engages the control tappet 9a, need merely be dimensioned for moving the ball-like valve closing body 8 away from its valve seat 7, so as to assure that when the exciter current 13 is without current, the ball-like valve closing body 8 will be given its structurally dictated maximum possible spacing from the valve seat 7, for the sake of the most unhindered possible flow of pressure fluid from the master cylinder 36 to the wheel brake 43 during a braking, tripped by means of the brake pedal 36', in which initially there is no danger of wheel locking. The second exemplary embodiment shown in FIG. 4 does require the technological expense for the axial stop 50, but in turn has the overall commercial advantage that the valve opening spring 10a need merely be adapted to the mass of the control tappet 9a and to the degree of motion damping of the tappet 9a desired according to the invention relative to the valve housing 3. The adaptation of the further spring 28a is done independently, from the standpoint only that the armature 16, after an exciting current to the exciter coil 13 is turned off, can be accelerated faster in the direction of its outset position than can the control tappet 9a.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A multiposition valve for installation in a hydraulic vehicle brake system of a vehicle comprising, a housing that has a longitudinal bore, a valve seat resting in the housing, a closing body associated with the valve seat, a control tappet connected to the closing body and displaceable in the longitudinal bore, an opening spring that engages the control tappet, an armature having a closed flat surface oriented toward the control tappet for displacing the control tappet and the closing body that closes the valve seat, an electromagnet which moves the armature, said electromagnet has a magnetic coil, a second spring (28, 28a) in the form of a restoring spring acts directly on the closed surface of the armature (16) for forcing the armature away from an end (26) of the control tappet oriented toward the armature (16) when the magnetic coil is not energized, said opening spring has a greater force than said second spring, the end (26) of the control tappet (9) is embodied in the manner of a tang which forms a shoulder (29) located on the control tappet (9); the second spring (28) that surrounds the end (26) of the control tappet is inserted into the bore (25), one end of the second spring (28) presses against the shoulder (29) and another end of the second spring presses against the closed surface of the armature (16), the valve opening spring (10) and the second spring (28) are adapted such that when the valve (2) is maximally opened, a force of the valve opening spring (10) overcomes a force of the second spring (28), and a radial play that exists between the control tappet (9) and the bore (25) is embodied narrowly, as a throttle that extends along the control tappet (9) and slows down the displacement of the control tappet.

2. A multiposition valve in accordance with claim 1, in which the valve seat (7) and the valve closing body (8) are embodied such that upon a fluid inflow through a through opening (6) associated with the valve seat (7) and an outflow of fluid between the valve seat (7) and the valve closing body (8), an aspiration effect acting upon the valve closing body (8) results, at least within certain stroke ranges of the valve closing body (8), in such a way that on the occasion of the onset of opening of the valve (2, 2a), the valve closing body (8) temporarily assumes a lesser spacing from the valve seat (7) than when the valve (2, 2a) is fully opened.

3. A multiposition valve for installation in a hydraulic vehicle brake system of a vehicle comprising, a housing that has a longitudinal bore, a valve seat resting in the housing, a closing body associated with the valve seat, a cylindrical, solid control tappet connected to the closing body and displaceable in the longitudinal bore, an opening spring that engages the control tappet, an armature having a closed flat surface oriented toward the control tappet for displacing the control tappet and the closing body that closes the valve seat, an electromagnet which moves the armature, said electromagnet has a magnetic coil, a second spring (28, 28a) in the form of a restoring spring acts directly on the closed surface of the armature (16) for forcing the armature away from an end (26) of the control tappet oriented toward the armature (16) when the magnetic coil is not energized, said opening spring has a greater force than said second spring, the end (26a) of the control tappet is embodied in the manner of a tang, with a smaller diameter than the bore (25) oriented toward the armature (16), the second spring (28a) is inserted into the bore (25) surrounding the end (26a) of the control tappet, and the second spring (28a) is braced on one face end on an axial stop (50) disposed in the bore (25) and on another end on the closed surface of the armature (16), the second spring (28a) being dimensioned such that the second spring is capable of accelerating the armature (16) faster than the valve opening spring (10) accelerates the control tappet (9a) together with the valve closing body (8), and a radial play existing between the control tappet (9a) and the bore (25) is embodied as a throttle along the control tappet (9a) that slows down the displacement of the control tappet.

4. A multiposition valve in accordance with claim 3 in which the axial stop (50) is embodied as a bush which is secured in the bore (25).

5. A multiposition valve in accordance with claim 3, in which the valve seat (7) and the valve closing body (8) are embodied such that upon a fluid inflow through a through opening (6) associated with the valve seat (7) and an outflow of fluid between the valve seat (7) and the valve closing body (8), an aspiration effect acting upon the valve closing body (8) results, at least within certain stroke ranges of the valve closing body (8), in such a way that on the occasion of the onset of opening of the valve (2, 2a), the valve closing body (8) temporarily assumes a lesser spacing from the valve seat (7) than when the valve (2, 2a) is fully opened.

* * * * *